US012772967B2

(12) United States Patent
Ike et al.

(10) Patent No.: US 12,772,967 B2
(45) Date of Patent: Oct. 27, 2026

(54) HANDLE KNOB OF FISHING REEL AND FISHING REEL PROVIDED WITH HANDLE KNOB

(71) Applicant: GLOBERIDE, Inc., Higashikurume (JP)

(72) Inventors: Taro Ike, Tokyo (JP); Yasuhisa Okamoto, Tokyo (JP); Yuichi Umezawa, Tokyo (JP); Daichi Sho, Tokyo (JP)

(73) Assignee: GLOBERIDE, Inc., Tokyo (JP)

( * ) Notice: Subject to any disclaimer, the term of this patent is extended or adjusted under 35 U.S.C. 154(b) by 112 days.

(21) Appl. No.: 18/906,587

(22) Filed: Oct. 4, 2024

(65) Prior Publication Data

US 2025/0228223 A1 Jul. 17, 2025

(30) Foreign Application Priority Data

Jan. 17, 2024 (JP) ................................ 2024-005241

(51) Int. Cl.
*A01K 89/00* (2006.01)

(52) U.S. Cl.
CPC ................................ *A01K 89/006* (2013.01)

(58) Field of Classification Search
CPC .................................................. A01K 89/006
See application file for complete search history.

(56) References Cited

U.S. PATENT DOCUMENTS 2,981,495 A * 4/1961 King .................... A01K 89/006 242/283
6,042,037 A 3/2000 Nanbu

FOREIGN PATENT DOCUMENTS

CN 202979939 U 6/2013
JP 08089140 A * 4/1996 ........... A01K 89/006
JP H09252689 A * 9/1997
JP 2003284462 A * 10/2003
JP 2004-236515 A 8/2004
JP 2017131159 A * 8/2017
JP 2022098035 A * 7/2022
WO WO-2022169927 A1 * 8/2022 ........... A01K 89/006

OTHER PUBLICATIONS

Jun. 1, 2026 Office Action issued in Chinese Patent Application No. 202411857911.6.

* cited by examiner

*Primary Examiner* — Michael Mccullough
(74) *Attorney, Agent, or Firm* — Oliff PLC

(57) ABSTRACT

A support shaft portion is attachable to a handle arm, and a grip portion integrally connected to the support shaft portion is able to be gripped by user. The grip portion is divided into first configuration portion and second configuration portion. The first configuration portion and second configuration portion are coupled via plurality of coupling portions. The grip portion is divided into a distal end portion to be gripped by user and a proximal end portion pressed by user using a thumb, in an axial direction of the grip portion with an imaginary axis line of the support shaft portion as a reference line, and coupling portion provided in the proximal end portion includes a claw portion formed on any of the first configuration portion, and the second configuration portion. A hole portion is formed on the first configuration portion and the second configuration portion and fixes the claw portion.

11 Claims, 7 Drawing Sheets

HANDLE KNOB OF FISHING REEL AND FISHING REEL PROVIDED WITH HANDLE KNOB

CROSS-REFERENCE TO RELATED APPLICATION

This application claims priority under 35 U.S.C. § 119 to Japanese Patent Application No. 2024-005241 filed on Jan. 17, 2024 in the Japanese Patent Office, the entire contents of each hereby incorporated by reference.

BACKGROUND OF THE INVENTION

1. Technical Field

The present invention relates to a handle knob of a fishing reel and a fishing reel provided with the handle knob.

2. Description of the Related Art

For example, a fishing reel such as a double bearing reel and a spinning reel is provided with a handle for winding a fishing line around a spool. A fishing person (a user of a fishing reel) grips a handle knob attached to a handle, and winds a fishing line around a spool by performing a winding operation of the handle. In such a fishing reel, an operation mode is selectively used according to the situation of the fishing area, the preference of the user, and the like. For example, when a fish is caught or the like, a winding operation (high load winding operation) in which a handle knob is strongly gripped is performed. In addition, when retrieving a bait or detecting a fish bite, a winding operation (light load winding operation) in which a handle knob is lightly gripped is performed.

JP 2003-284462 A discloses a fishing reel capable of selectively using a handle knob (handle knob) according to the preference of the user. A handle knob of the fishing reel connects a cylindrical portion as a support shaft and a grip portion (knob main body) in a substantially T shape. The user can change a positional relationship between the cylindrical portion and the grip portion in accordance with the preference of the user or a load state at the time of the winding operation.

SUMMARY OF THE INVENTION

Incidentally, the fishing reel may be used for a long time such as ten hours or more per day, for example. In addition, how to hold the handle knob and how to hold a finger on the handle knob vary depending on the preference of the user or are changed depending on fishing situations. The fishing reel is required to reduce a burden on the user even in a case of being used for a long time.

In the handle knob in the related art, since two components divided into a first configuration portion and a second configuration portion are coupled by a screw, it is necessary to form the coupling portion to be screwed to be thick, and the weight by the screw is also added, so that particularly the proximal end portion side (the portion pressed by the user with the thumb on the support shaft side) is heavy, and it is difficult to obtain the weight balance of the entire handle knob. When the user uses the handle knob for a long time, the burden on the hand and the finger is large, and fatigue is likely to occur.

In addition, in the case of screw coupling, it is necessary to secure a clearance in accordance with the size of the screw (the screw diameter, the head size, and the like) and the size of the screw receiving portion, and accordingly, the protrusion length of the proximal end portion becomes long, so that the thumb is hardly hooked and the burden on the thumb is increased in a case of using the handle knob for a long time The present invention has been made in view of the above problems, and an object of the present invention is to provide a handle knob of a fishing reel capable of reducing a burden on a hand and a finger of a user and making the user less tired even in a case where the user uses the reel for a long time, and a reel provided with the handle knob.

In order to solve the above-described problem, a handle knob of a fishing reel according to an aspect of the present invention comprises a support shaft portion that is attachable to a handle arm; and a grip portion that is integrally connected to the support shaft portion and is able to be gripped by a user, in which the grip portion is divided into a first configuration portion and a second configuration portion, the first configuration portion and the second configuration portion are coupled via a plurality of coupling portions, the grip portion is divided into a distal end portion to be gripped by the user and a proximal end portion pressed by the user using a thumb, with an imaginary axis line of the support shaft portion as a reference line, and the coupling portion provided in the proximal end portion comprises a claw portion formed on any one of the first configuration portion and the second configuration portion, and a hole portion that is formed on the other of the first configuration portion and the second configuration portion and to which the claw portion is inserted and fixed.

In addition, another aspect of the present invention is a fishing reel comprising the handle knob.

According to the present invention, it is possible to provide a handle knob of a fishing reel which can optimally design the weight balance of the entire handle knob by reducing the weight on the proximal end portion side of the handle knob, can shorten the protrusion length on the proximal end side, and can reduce the burden on the hands and fingers and make the user less tired even in a case where the user operates the reel for a long time, and a fishing reel comprising the handle knob.

DETAILED DESCRIPTION

Basic Configuration of Fishing Reel According to Embodiment

Figure 1:
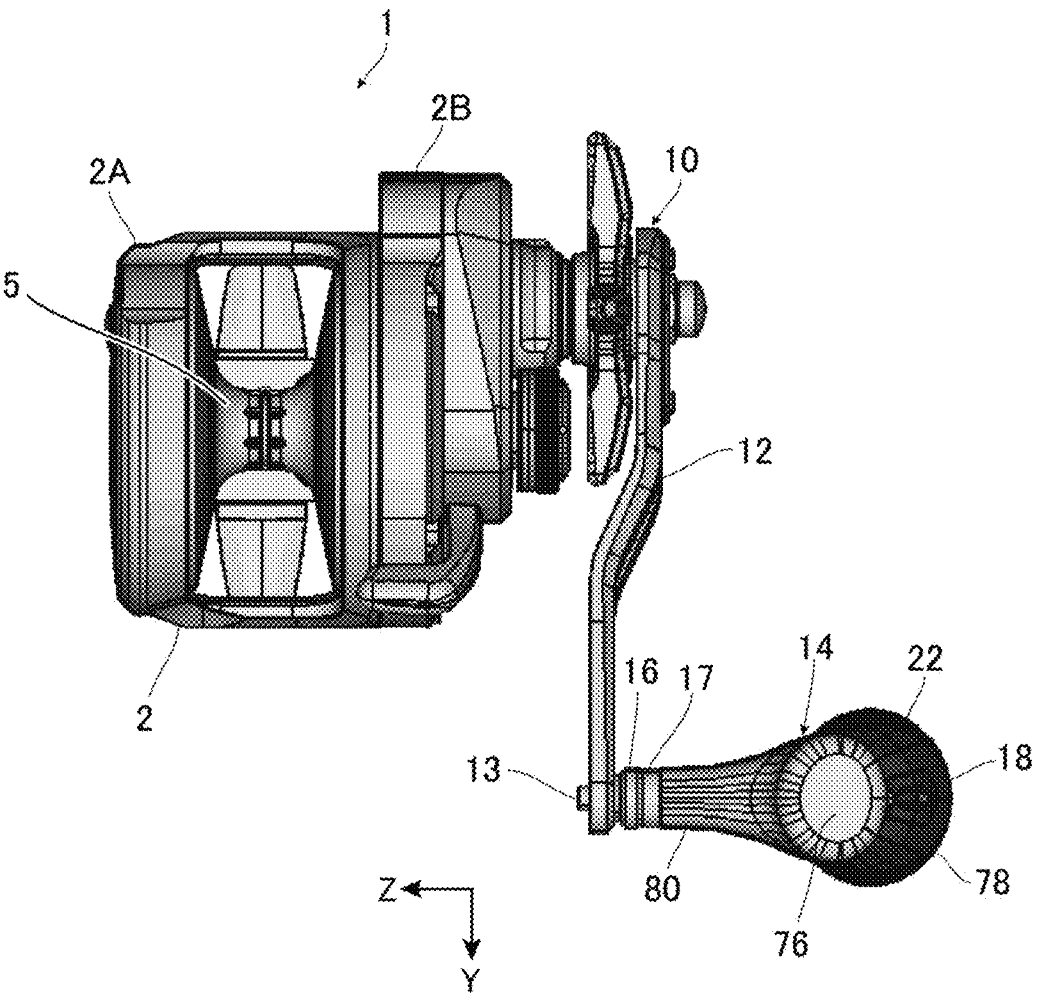
FIG. 1 is a plan view illustrating a fishing reel according to an embodiment of the present invention.

Hereinafter, embodiments of the present invention will be described with reference to the drawings. FIG. 1 illustrates a fishing reel 1 according to an embodiment of the present invention. In FIG. 1 and FIGS. 2 to 5 described later, a ridge-attached design model image (shaded) created by CAD is used.

The fishing reel 1 in the example of FIG. 1 is a double bearing reel, and comprises a reel main body 2. The reel main body 2 has left and right side plates 2A and 2B, and a handle 10 is attached to one side plate (here, the right side plate 2B).

A spool 5 is rotatably supported between the left and right side plates 2A and 2B. A known power transmission mechanism (not illustrated) is provided in the reel main body 2. When a fishing person (user of the fishing reel 1) rotates the handle 10 to perform a winding operation, the spool 5 is rotationally driven via the power transmission mechanism, and the fishing line is wound around the spool 5.

The handle 10 comprises a handle arm 12 and a handle knob 14. The handle arm 12 is attached to an end of a handle shaft (not illustrated) constituting the above-described power transmission mechanism.

<Configuration of Handle Knob>

The handle knob 14 comprises a support shaft portion 16 and a grip portion 18. The support shaft portion 16 is configured by concentrically connecting a cylindrical portion 17 and a connection shaft portion 13. The connection shaft portion 13 is inserted into the cylindrical portion 17. The connection shaft portion 13 is fixed to the end of the handle arm 12 by a method such as caulking, and the cylindrical portion 17 and the grip portion 18 are integrally rotated.

The grip portion 18 is provided on the distal end side of the support shaft portion 16 to protrude to form a substantially L shape. The grip portion 18 constitutes most of the design relating to the appearance of the handle knob 14. The grip portion 18 is gripped by the user during a winding operation or the like, and a mode of gripping the grip portion 18 will be described later.

Figure 2:
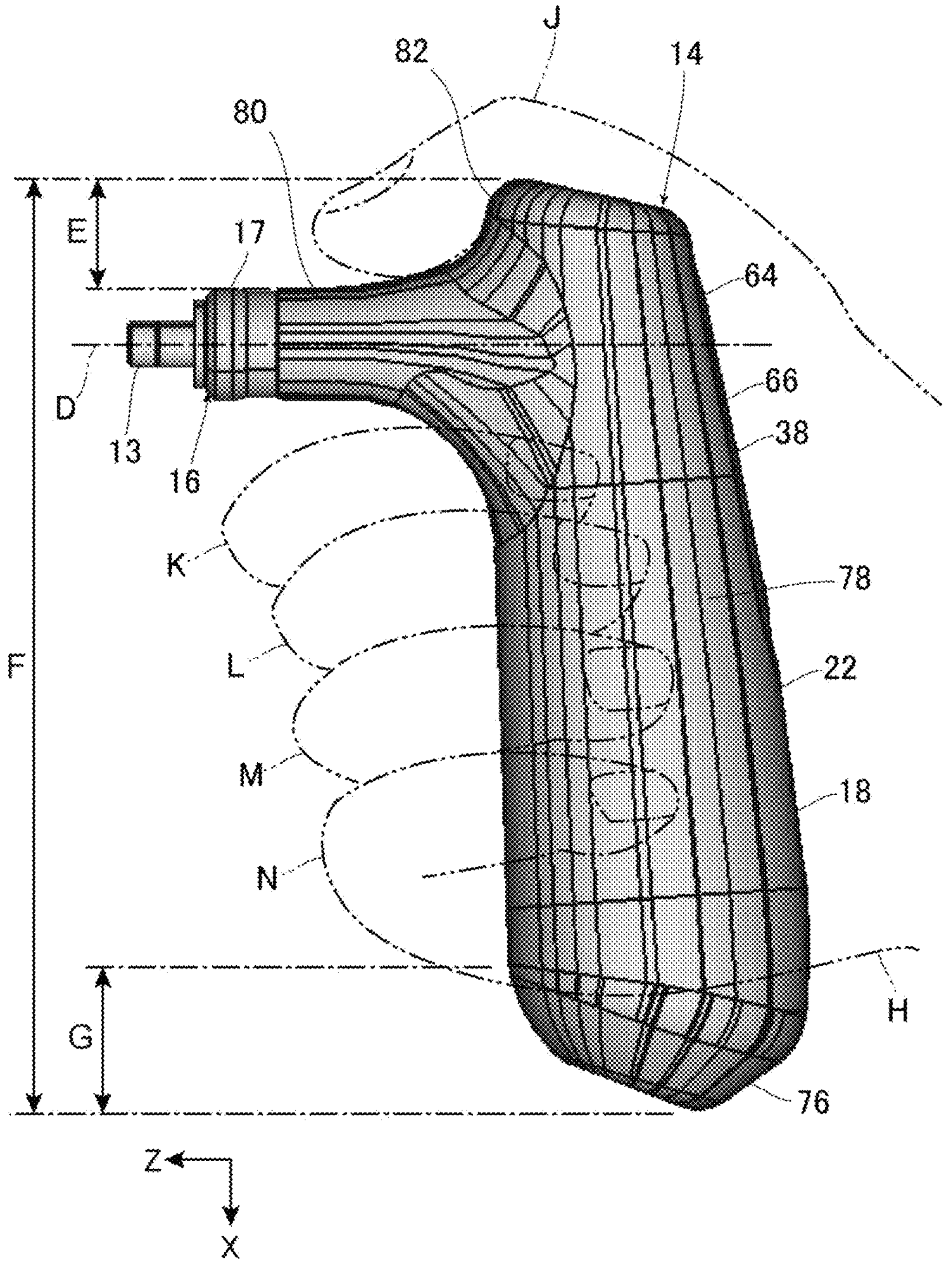
FIG. 2 is an explanatory view illustrating a side surface of a handle knob and a grip example.
Figure 3:
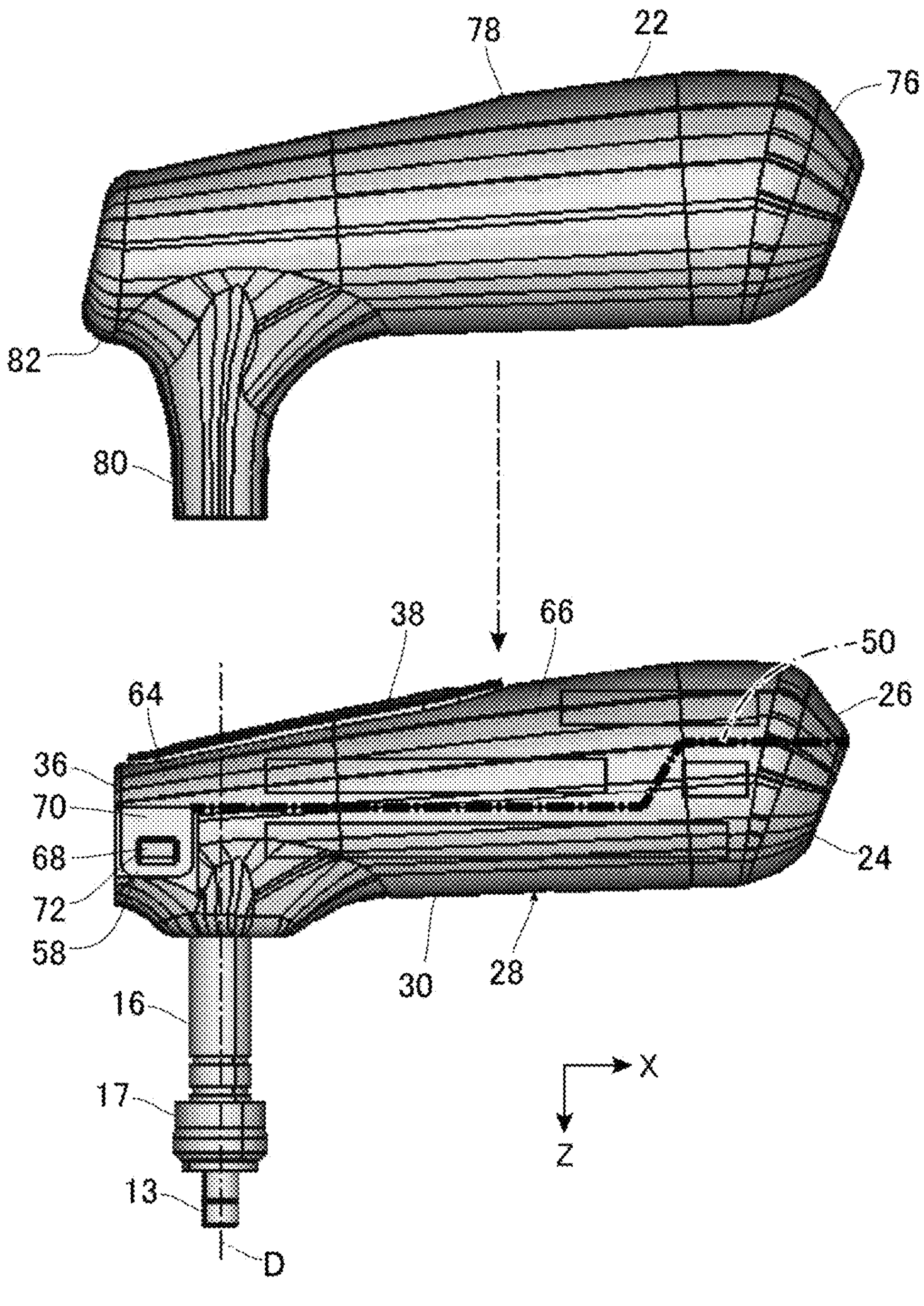
FIG. 3 is a side view illustrating an assembly extracted from a buffer portion.

As illustrated in FIGS. 1 to 3, the grip portion 18 mainly comprises two parts, that is, a buffer portion 22 made of a rubber material or the like, a first configuration portion 24, and a second configuration portion 26. The first configuration portion 24 and the second configuration portion 26 are coupled to each other to constitute an assembly (assembly) 28. The buffer portion 22 covers and hides most of the assembly 28.

FIG. 2 illustrates a state in which the buffer portion 22 covers the assembly 28, and FIG. 3 illustrates a state in which the buffer portion 22 is separated from the assembly 28. In the present embodiment, the buffer portion 22 is integrated with the assembly 28 by insert molding performed by arranging the assembly 28 inside.

Figure 4:
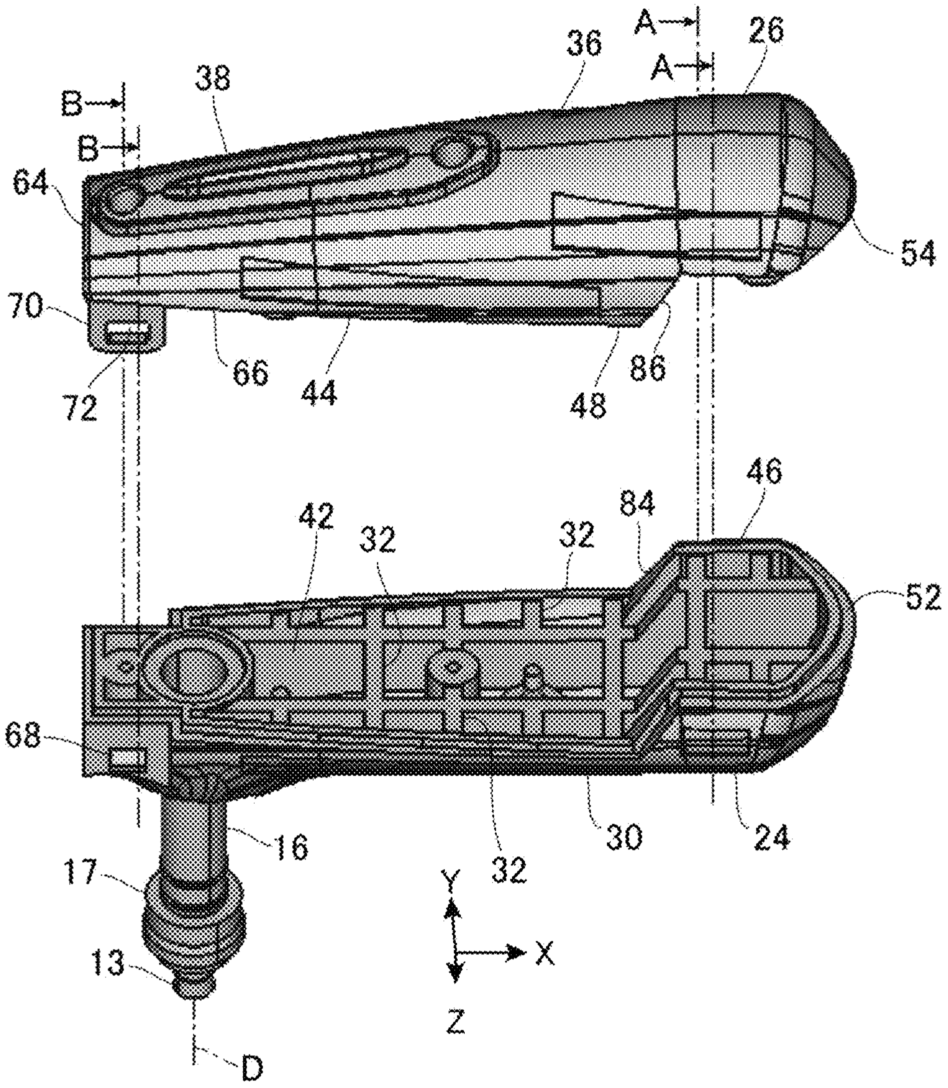
FIG. 4 is a perspective view illustrating a first configuration portion and a second configuration portion that are separated from each other.

As illustrated in FIGS. 3 and 4, the assembly 28 is formed by coupling (also referred to as "joining") the first configuration portion 24 and the second configuration portion 26 facing each other. Among them, the first configuration portion 24 has a first hull form portion 30 that is a resin molded product, and as illustrated in FIG. 4, a plurality of ribs 32 is provided inside the first hull form portion 30 to protrude in a grid shape.

The support shaft portion 16 is integrally provided on the first hull form portion 30 to protrude by insert molding. The support shaft portion 16 is disposed at a portion of the first hull form portion 30 on one end side in a length direction (here, X direction), and is provided to linearly protrude in a height direction (here, Z direction) of the first hull form portion 30.

Figure 5:
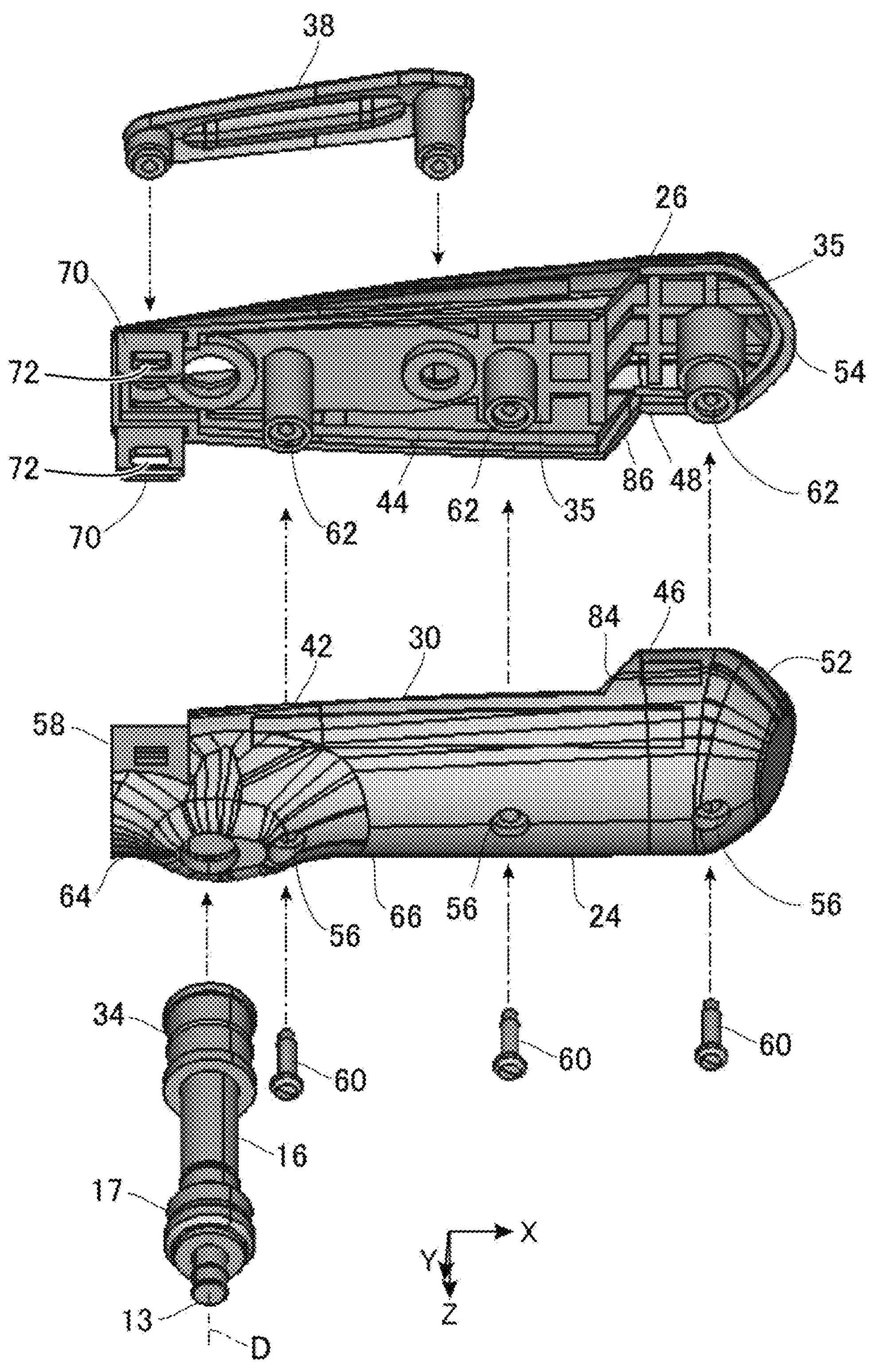
FIG. 5 is a perspective view illustrating a first configuration portion and a second configuration portion that are separated from each other, at a different angle.

As illustrated in an exploded manner in FIG. 5, the support shaft portion 16 is formed in a stepped round bar shape, and an enlarged portion 34 expanding in the radial direction is provided on the proximal end side of the support shaft portion 16. The enlarged portion 34 functions as a retaining portion from the first hull form portion 30 after insert molding. Furthermore, the enlarged portion 34 also functions as a coupling strength improving portion that improves the coupling strength between the support shaft portion 16 and the first hull form portion 30.

The second configuration portion 26 has a second hull form portion 36 that is a resin molded product, and as illustrated in FIG. 5, a plurality of ribs 35 is provided inside the second hull form portion 36 to protrude in a grid shape. In the second hull form portion 36, a name plate portion 38 is fixed to the main body having been inserted (insert-molded) with screws. Alternatively, the name plate portion 38 may be integrally provided on the second hull form portion 36 to protrude by insert molding. The name plate portion 38 is used, for example, for indicating a product name, a brand name, and the like related to the fishing reel 1. The name plate portion 38 is disposed at a portion of the second hull form portion 36 shifted to one end side in the length direction (X direction), and protrudes somewhat (for example, about several millimeters) from the second hull form portion 36.

Figure 6A:
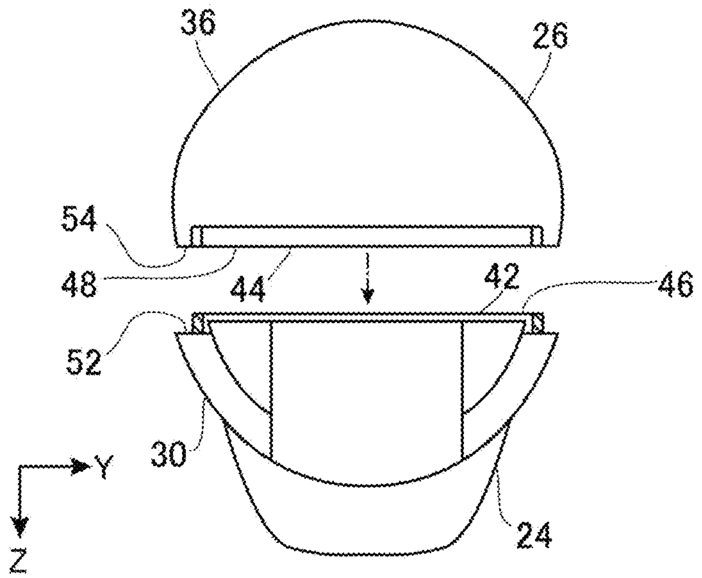
FIG. 6A is a cross-sectional view schematically illustrating a state before a portion along line A-A in FIG. 4 is coupled.
Figure 6B:
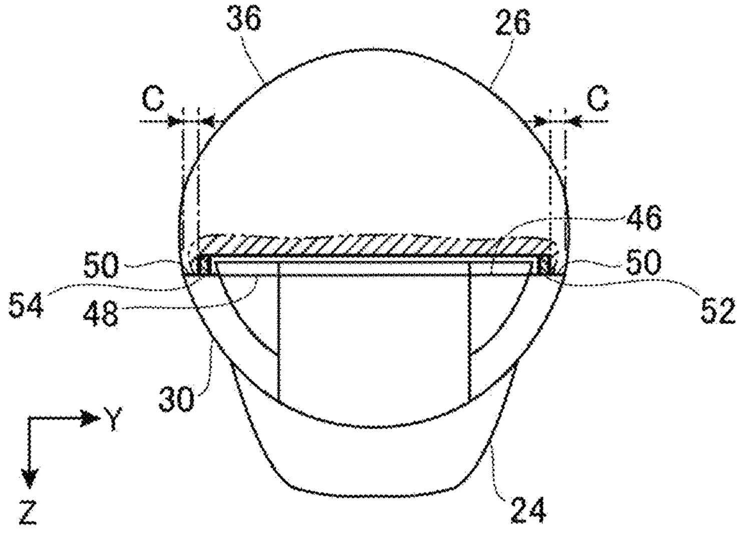
FIG. 6B is a cross-sectional view schematically illustrating a state after the portion along line A-A in FIG. 4 is coupled.
Figure 7A:
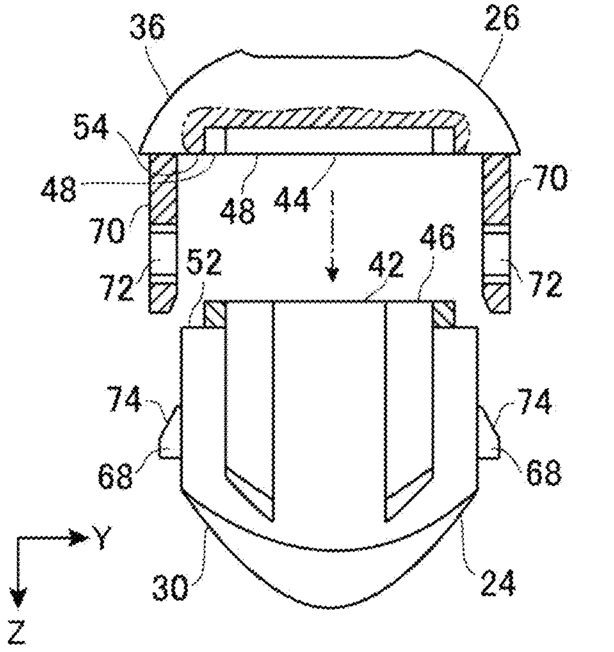
FIG. 7A is a cross-sectional view schematically illustrating a state before a portion along line B-B in FIG. 4 is coupled.
Figure 7B:
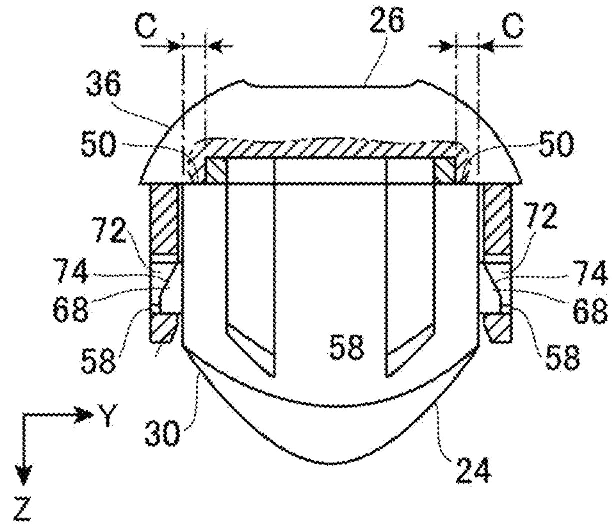
FIG. 7B is a cross-sectional view schematically illustrating a state after the portion along line B-B in FIG. 4 is coupled.

As illustrated in FIG. 4, the first hull form portion 30 and the second hull form portion 36 face each other at opening portions 42 and 44. Edge portions (opening edge portions) 46 and 48 of the opening portions 42 and 44 have, for example, uneven shapes as partially omitted in FIGS. 6A, 6B, 7A, and 7B. Here, FIGS. 6A and 6B and FIGS. 7A and 7B illustrate cross sections at different positions. FIGS. 6A and 6B schematically illustrate cross sections taken along line A-A in FIG. 4, and FIGS. 7A and 7B schematically illustrate cross sections taken along line B-B in FIG. 4. In FIGS. 6A, 6B, 7A, and 7B, hatching is applied only to the main parts related to the description of the opening edge portions 46 and 48.

In a state where the first hull form portion 30 and the second hull form portion 36 are assembled (FIGS. 6B and 7B), the opening portions 42 and 44 form a so-called labyrinth structure (labyrinth seal structure). A coupling portion (also referred to as a "joint portion") 50 which is a boundary between the opening edge portions 46 and 48 is bent by a combination of stepped irregularities.

In the coupling portion 50, for example, end surfaces 52 and 54 having a narrow width C (about 2 to 3 mm or the like) are closely fitted to each other (so that no gap is generated in a liquid-tight manner) in a state of being pressurized by a plurality of coupling portions (generic name of a screw portion 56 and a locking portion 58 to be described later) to be described later. In the present embodiment, such a force to butt while pressurizing is referred to as "coupling force". As illustrated in FIG. 5, the coupling portion comprises three screw portions 56, and two locking portions 58 provided in a left-right direction (Y direction).

Among these, the screw portion 56 comprises a coupling screw 60. The coupling screw 60 is inserted into a through-hole (reference numeral is omitted) formed in the first hull form portion 30 of the first configuration portion 24, and penetrates the first hull form portion 30. The distal end portion of the coupling screw 60 reaches the second hull form portion 36 of the second configuration portion 26, and is screwed into a screw receiving portion 62 of the second hull form portion 36. By tightening the coupling screw 60, a coupling force is generated, and the first configuration portion 24 and the second configuration portion 26 are coupled while being attracted to each other and pressurized.

The coupling screw 60 and the support shaft portion 16 are aligned on the same straight line extending in the length direction (X direction). The coupling screws 60 are spaced at substantially equal intervals. The coupling screws 60 is disposed on the distal end side of first configuration portion 24 when the side on which the support shaft portion 16 is disposed is defined as the proximal end side.

Here, the position of the support shaft portion 16 is shifted to one side of the first configuration portion 24 (first hull form portion 30) in the length direction (X direction) of the first configuration portion 24. In the present embodiment, with an imaginary axis line D of the support shaft portion 16 illustrated in FIGS. 2 and 3 as a reference line (boundary), in an axial direction (length direction) of the handle knob 14, the upper side of FIG. 2 and the left side of FIG. 3 are referred to as a "proximal end side" and the opposite side (right side of FIG. 3) is referred to as a "distal end side" with respect to the first configuration portion 24, the first hull form portion 30, the assembly 28, the grip portion 18, and the handle knob 14.

Hereinafter, among the first configuration portion 24, the first hull form portion 30, the assembly 28, the grip portion 18, and the handle knob 14, the first configuration portion 24 and at least one other configuration (at least one of the first hull form portion 30, the assembly 28, the grip portion 18, and the handle knob 14) may be collectively referred to as the "first configuration portion 24 and the like".

As described above, the boundary between the "proximal end side" and the "distal end side" of the first configuration portion 24 and the like is defined with the imaginary axis line D (refer to FIGS. 2 and 3) of the support shaft portion 16 as the reference line, and in the axial direction (length direction) of the handle knob 14, a part on the proximal end side is defined as a "proximal end portion 64" and a part on the distal end side is defined as a "distal end portion 66".

As illustrated in FIGS. 4 and 5 and the like, regarding the coupling portion, three coupling screws 60 are arranged in the first configuration portion 24 and the like in the distal end portion 66, and the locking portions 58 are arranged in the same straight line in a width direction (Y direction) of the first configuration portion 24 and the like in the proximal end portion 64.

The locking portion 58 provided in the proximal end portion 64 is not coupling means using a screw, and is configured by a claw portion 68 and a locking piece portion 70 as illustrated in FIGS. 4, 5, 7A, and 7B. The claw portion 68 is formed in the first hull form portion 30, and the locking piece portion 70 is formed in the second hull form portion 36. Note that the present invention is not limited thereto, and for example, the claw portion 68 may be formed in the second hull form portion 36, and the locking piece portion 70 may be formed in the first hull form portion 30.

The claw portion 68 is integrally molded with the first hull form portion 30 to protrude to the side (Y direction). Furthermore, the claw portion 68 has a hook shape of a modified pentagon similar to that obtained by chamfering two corners of a right triangle shape.

The locking piece portion 70 is integrally molded with the second hull form portion 36 and protrudes in a band plate shape. As illustrated in FIGS. 4 and 5, a rectangular hole portion 72 is formed on the distal end side of the locking piece portion 70. The shape and size of the rectangular hole portion 72 are matched with those of the claw portion 68, and the claw portion 68 can enter.

The claw portion 68 and the locking piece portion 70 constitute a snap fit that generates a coupling force by an elastic force. Specifically, when the second configuration portion 26 is combined with the first configuration portion 24, as illustrated in FIG. 7A, the two locking piece portions 70 approach the first configuration portion 24 to sandwich the first hull form portion 30 from the outside. Furthermore, the distal end portion of the locking piece portion 70 reaches the claw portion 68 of the first hull form portion 30, and is elastically deformed outward following an inclined portion 74 of the claw portion 68 (not illustrated). The claw portion 68 enters the hole portion 72 in a situation where the opening edge portions 46 and 48 of the first hull form portion 30 and the second hull form portion 36 overlap each other. Then, the locking piece portion 70 is detached from the inclined portion 74 of the claw portion 68, and is press-fitted and fixed (locked) to the claw portion 68 by an elastic restoring force.

The dimensional relationship between the locking piece portion 70 and each portion of the claw portion 68 is designed such that coupling in the proximal end portion 64 generates an elastic coupling force (press-fitting and fixing) by the locking between the locking piece portion 70 and the claw portion 68. By using such a locking portion 58, the first configuration portion 24 and the second configuration portion 26 (the first hull form portion 30 and the second hull form portion 36) are coupled while being pressurized so as not to form a gap in the coupling portion 50 as illustrated in FIG. 7B in the proximal end portion 64.

Note that, regarding the arrangement of the locking portions 58, it is sufficient that at least a part (one) of the plurality of locking portions 58 is positioned in the proximal end portion 64, and an appropriate number may be adopted for the distal end portion 66. That is, the locking portion 58 is essential for the proximal end portion 64, but the installation thereof is arbitrary in the distal end portion 66. How to arrange the screw portion 56 and the locking portion 58 as the coupling means of the distal end portion 66 is appropriately selected and determined on the basis of the weight balance of the entire handle knob 14.

The assembly 28 assembled in this manner is covered by the buffer portion 22 as described above (FIG. 2). The buffer portion 22 is made of rubber (synthetic rubber), and covers the assembly 28 in a state where a part of the support shaft portion 16 and a part of the name plate portion 38 (a surface on which a product name or the like is written) of the assembly 28 are exposed. The buffer portion 22 forms a main body portion 78 and a connection portion 80 of the grip portion 18. The main body portion 78 is a portion to be gripped by the user, and the connection portion 80 is a portion integrally formed with the main body portion 78 and protruding substantially at a right angle from the main body portion 78. The connection portion 80 covers the proximal end side of the support shaft portion 16, in the proximal end portion 64.

At the time of molding the buffer portion 22, the assembly 28 is covered with the heated and melted rubber in a molding die. In the assembly 28, as described above, the coupling between the first configuration portion 24 and the second configuration portion 26 (the first hull form portion 30 and the second hull form portion 36) is performed by the coupling screw 60 and the locking portion 58 so as not to form a gap. Therefore, it is possible to prevent the melted rubber from entering the coupling portion 50, and it is possible to prevent that the melted rubber solidifies in a state of entering the coupling portion 50 and that the total weight of the buffer portion 22 exceeds a range of the design value.

That is, by preventing the rubber from entering the coupling portion, it is possible to realize the weight balance as the design value of the proximal end portion 64 and the distal end portion 66 described above and the design weight of the entire handle knob.

Subsequently, as described above, in the handle knob 14 (FIG. 2), the grip portion 18 is provided on the distal end side of the support shaft portion 16 to protrude to form a substantially L shape. In the grip portion 18, the buffer portion 22 is exposed, and most of the outer surface of the grip portion 18 is constituted by the buffer portion 22.

In the present embodiment, the main body portion 78 of the grip portion 18 has a substantially elliptical cross section, the main body portion 78 is formed in a tapered shape, and the size of the cross section of the main body portion 78 is gradually increased from the proximal end portion 64 side to the distal end portion 66 side, and has a spindle shape as a whole. On the other hand, a protrusion end portion 76 of the main body portion 78 is formed in a tapered shape that becomes thinner toward the distal end. Since the grip portion 18 has a spindle shape, even in a case where the user grips a slightly lower portion of the grip portion 18, it is easy to grip and does not cause pain.

A portion of the main body portion 78 on a side where the connection portion 80 is displaced protrudes with respect to the connection portion 80. Then, a protrusion portion (hereinafter, referred to as a "main body protrusion portion") 82 in the proximal end portion 64 is formed at a portion of the main body portion 78 on a side where the connection portion 80 is displaced.

The main body protrusion portion 82 protrudes from the outer peripheral surface of the connection portion 80. As illustrated in FIG. 2, a protrusion amount E of the main body protrusion portion 82 with respect to the outer peripheral surface of the connection portion 80 is smaller than the thickness of a thumb J of a hand H of the user (23.3 mm which is the maximum value of a first joint width (B05) to be described later). The protrusion amount E is such a value that the thumb J of the user gripping the handle knob 14 can easily get over the main body protrusion portion 82 while gripping the handle knob 14.

In the present embodiment, the protrusion amount E is about 5 to 20 mm. By setting the protrusion amount E in this manner, for example, the movement of the thumb J of the user can be prevented from being hindered by the main body protrusion portion 82 as compared with a case where the protrusion amount E exceeds 20 mm.

Note that the protrusion amount E is preferably in a range of 5 to 15 mm, and more preferably in a range of 5 to 10 mm. In a case where the protrusion amount E is, for example, less than 0 to 5 mm, it becomes difficult to lock the thumb J, and the operational feeling is excessively different from that of a product in the related art (for example, a fishing reel having a shape as disclosed in JP 2003-284462 A). In addition, in a case where the protrusion amount E exceeds 25 mm, it is easy to move the thumb J so as to straddle (get over) the main body protrusion portion 82.

As described above, the coupling between the first configuration portion 24 and the second configuration portion 26 (the first hull form portion 30 and the second hull form portion 36) is performed by the locking portion 58 (snap fit type) by the claw portion 68 and the locking piece portion 70, and thereby the protrusion amount E of the main body protrusion portion 82 can be formed small.

For example, in a case where the locking portion 58 is replaced with the screw portion 56 as in the related art, a fourth screw portion 56 is disposed on the same straight line (straight line in the X direction) as the other screw portions 56, and the coupling screw 60 is screwed into the side surface of the main body protrusion portion 82 (in the Z direction). Therefore, it is necessary to secure the clearance and secure the protrusion amount E of the main body protrusion portion 82 in accordance with the size of the coupling screw 60 (the screw diameter, the head size, and the like) and the size of the screw receiving portion 62. However, in design, the protrusion amount E of the main body protrusion portion 82 is affected by the size of the screw portion 56, and it becomes difficult to suppress the protrusion amount E of the main body protrusion portion 82.

However, as in the present embodiment, by adopting the locking portion 58 by the claw portion 68 and the locking piece portion 70 as the coupling means of the proximal end portion 64, the first configuration portion 24 and the second configuration portion 26 (the first hull form portion 30 and the second hull form portion 36) can be coupled while suppressing the weight increase and the protrusion length of the proximal end portion 64, and it is possible to reduce the burden related to the long time use of the user as a whole.

Note that, in the present embodiment, the locking portions 58 are arranged at one position in the X direction and at two positions in the Y direction, and the total number of the locking portions 58 is two. However, the present invention is not limited thereto, and the locking portions 58 may be disposed at two or more positions in the X direction, for example. For example, it is conceivable to arrange the locking portions 58 at two positions in the X direction and two positions in the Y direction. In this case, the total number of the locking portions 58 is 4. Furthermore, in this case, the two additional locking portions 58 can be arranged in the distal end portion 66. In addition, all the coupling portions may be used as the locking portions 58 as long as a sufficient coupling force can be obtained.

In addition, as described above, the thickness of the main body portion 78 is gradually changed from the proximal end portion 64 side to the distal end portion 66 side. Therefore, as illustrated in FIG. 2, in a case where the user grips the handle knob 14 with the thumb J facing the proximal end portion 64 side and a little finger N facing the distal end portion 66 side, the little finger N is hooked on the thick side of the main body portion 78. Then, the little finger N can be hooked on the main body portion 78 without being largely bent as compared with a case where the little finger N is hooked on a relatively thin portion.

Therefore, the force of the little finger N is easily transmitted to the main body portion 78, and the main body portion 78 can be efficiently gripped by the little finger N. Furthermore, the entire fingers including other fingers (thumb J, forefinger K, middle finger L, ring finger M) can be used in a well-balanced manner, and the operability and use feeling of the fishing reel 1 can be improved. This also makes it possible to comprehensively reduce the burden on the user.

Here, in order to make the little finger N hang on the thick portion of the handle knob 14 in more situations (at a high frequency), it is preferable to make the length G of the protrusion end portion 76 as small as possible within a range of the entire length F of the main body portion 78 and gradually increase the thickness of the main body portion 78 as illustrated in FIG. 2. For example, it is conceivable to set the ratio of the length G of the protrusion end portion 76 to the entire length F of the main body portion 78 to 20% or less (preferably 15% or less, more preferably 10% or less).

In addition, in a case where the protrusion amount E of the main body protrusion portion 82 is excessively large, not only the thumb J but also the forefinger K may be hooked on the main body protrusion portion 82. Then, in a case where the forefinger K is hooked on the main body protrusion portion 82, the forefinger K is likely to feel pain due to use for a long time. However, as in the fishing reel 1 of the present embodiment, the forefinger K can be prevented from being hooked on the main body protrusion portion 82 by reducing the protrusion amount E of the main body protrusion portion 82. This also makes it possible to comprehensively reduce the burden on the user.

Here, as illustrated in FIGS. 3 to 5, stepped portions 84 and 86 are formed at the opening edge portion 46 of the first hull form portion 30 and the opening edge portion 48 of the second hull form portion 36, and the shapes of both the opening edge portions 46 and 48 are not simple linear shapes. By forming the stepped portions 84 and 86 in this manner, it is easy to prevent the shapes of the first hull form portion 30 and the second hull form portion 36 from excessively bulging or being narrowed in the width direction (Y direction) to cause undercut during resin molding. In FIG. 3, the boundary (coupling portion 50) between the opening edge portion 46 of the first hull form portion 30 and the opening edge portion 48 of the second hull form portion 36 is emphasized by a thick dashed-dotted line.

Although the embodiments of the present invention have been described above, the present invention is not limited to the above-described embodiments, and various modifications can be made without departing from the gist thereof.

For example, the embodiment has been described in which the claw portion 68 and the locking piece portion 70 crimp the opening edge portions 46 and 48 of the first hull form portion 30 and the second hull form portion 36 by using snap fit that generates coupling force by the elastic force. However, the claw portion 68 and the locking piece portion 70 may be welded and crimped in a state where the first hull form portion 30 and the second hull form portion 36 are pressed against each other.

What is claimed is:

1. A handle knob of a fishing reel comprising:

a support shaft portion that is attachable to a handle arm; and a grip portion that is integrally connected to the support shaft portion and is able to be gripped by a user, wherein the grip portion is divided into a first configuration portion and a second configuration portion, the first configuration portion and the second configuration portion are coupled via a plurality of coupling portions, the grip portion is divided into a distal end portion to be gripped by the user and a proximal end portion pressed by the user using a thumb, in an axial direction of the grip portion with an imaginary axis line of the support shaft portion as a reference line, one of the coupling portions is in the proximal end portion and comprises a claw portion on one of the first configuration portion and the second configuration portion, and a hole portion that is on the other of the first configuration portion and the second configuration portion and fixes the claw portion, the hole portion is in an elastically deformable convex portion that is able to be elastically deformed, and the elastically deformable convex portion constitutes a snap fit by meshing with the claw portion.

2. The handle knob of a fishing reel according to claim 1, another of the coupling portions is in the distal end portion and comprises a screw portion that couples the first configuration portion and the second configuration portion using a screw.

3. The handle knob of a fishing reel according to claim 1, wherein the grip portion has a shape in which a diameter is gradually increased from the proximal end portion to the distal end portion.

4. The handle knob of a fishing reel according to claim 3, wherein the grip portion has a spindle shape.

5. The handle knob of a fishing reel according to claim 1, wherein a protrusion length of the proximal end portion from an outer peripheral surface of a connection portion connected to the support shaft portion is 5 to 20 mm.

6. A fishing reel comprising the handle knob of a fishing reel according to claim 1.

7. A handle knob of a fishing reel comprising:

a support shaft portion that is attachable to a handle arm; and a grip portion that is integrally connected to the support shaft portion and is able to be gripped by a user, wherein the grip portion is divided into a first configuration portion and a second configuration portion, the first configuration portion and the second configuration portion are coupled via a plurality of coupling portions, the grip portion is divided into a distal end portion to be gripped by the user and a proximal end portion pressed by the user using a thumb, in an axial direction of the grip portion with an imaginary axis line of the support shaft portion as a reference line, one of the coupling portions is in the proximal end portion and comprises a claw portion on one of the first configuration portion and the second configuration portion, and a hole portion that is on the other of the first configuration portion and the second configuration portion and fixes the claw portion, and another of the coupling portions is in the distal end portion and comprises a screw portion that couples the first configuration portion and the second configuration portion using a screw.

8. The handle knob of a fishing reel according to claim 7, wherein the grip portion has a shape in which a diameter is gradually increased from the proximal end portion to the distal end portion.

9. The handle knob of a fishing reel according to claim 8, wherein the grip portion has a spindle shape.

10. The handle knob of a fishing reel according to claim 7, wherein a protrusion length of the proximal end portion from an outer peripheral surface of a connection portion connected to the support shaft portion is 5 to 20 mm.

11. A fishing reel comprising the handle knob of a fishing reel according to claim 7.

* * * * *